(12) United States Patent
Stessen (10) Patent No.: US 10,313,687 B2
(45) Date of Patent: Jun. 4, 2019

(54) SATURATION PROCESSING SPECIFICATION FOR DYNAMIC RANGE MAPPINGS

(71) Applicant: KONINKLIJKE PHILIPS N.V., Eindhoven (NL)

(72) Inventor: Jeroen Hubert Christoffel Jacobus Stessen, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 90 days.

(21) Appl. No.: 15/515,156

(22) PCT Filed: Jul. 16, 2015

(86) PCT No.: PCT/EP2015/066294
§ 371 (c)(1),
(2) Date: Mar. 29, 2017

(87) PCT Pub. No.: WO2016/055178
PCT Pub. Date: Apr. 14, 2016

(65) Prior Publication Data
US 2017/0223367 A1  Aug. 3, 2017

(30) Foreign Application Priority Data
Oct. 10, 2014  (EP) .................................. 14188425

(51) Int. Cl.
*G06T 5/00* (2006.01)
*H04N 1/60* (2006.01)
(Continued)

(52) U.S. Cl.
CPC .......... *H04N 19/186* (2014.11); *G06T 5/009* (2013.01); *H04N 1/6027* (2013.01); *H04N 9/68* (2013.01);
(Continued)

(58) Field of Classification Search
CPC ........... G06K 9/00026; G06K 9/00087; H04N 19/186; H04N 19/98; H04N 1/6027;
(Continued)

(56) References Cited

U.S. PATENT DOCUMENTS

| 5,349,390 A | 9/1994 | Stessen et al. |
| 5,555,031 A * | 9/1996 | Van Rooij ................ H04N 9/68 348/645 |

(Continued)

FOREIGN PATENT DOCUMENTS

| DE | 19812526 A1 * | 9/1999 | ............... H04N 9/68 |
| DE | 19812526 A1 | 9/1999 | |

(Continued)

*Primary Examiner* — Menatoallah Youssef (57) ABSTRACT

Because we needed a new color saturation processing in tune with dynamic range transformations necessary for handling the recently introduced high dynamic range image encoding, we describe a color saturation modification apparatus (101) arranged to determine linear color differences (R-Y,G-Y,B-Y) on the basis of an input color (R,G,B) and a luminance (Y) of the input color, and to do a multiplication of the linear color differences (R-Y,G-Y,B-Y) with a gain (g), characterized in that the apparatus is arranged to determine the gain as a function of a difference value (V_in-Y) being defined as the value of the highest one of the linear color differences (R-Y,G-Y,B-Y).

4 Claims, 5 Drawing Sheets

(51) Int. Cl.
*H04N 9/68* (2006.01)
*H04N 19/85* (2014.01)
*H04N 19/98* (2014.01)
*H04N 19/186* (2014.01)

(52) U.S. Cl.
CPC ............ *H04N 19/85* (2014.11); *H04N 19/98* (2014.11); *G06T 2207/20208* (2013.01)

(58) Field of Classification Search
CPC .......... H04N 9/68; H04N 19/85; G06T 5/009; G06T 2207/20208
See application file for complete search history.

(56) References Cited

U.S. PATENT DOCUMENTS

| | | |
|---|---|---|
| 6,111,607 A | 8/2000 | Kameyama |
| 7,743,114 B1 | 6/2010 | Srinivasan et al. |
| 8,218,625 B2 | 7/2012 | Ward et al. |
| 2001/0048476 A1 | 12/2001 | Nakamura et al. |
| 2008/0192819 A1* | 8/2008 | Ward ...................... G06T 5/009 375/240.02 |

FOREIGN PATENT DOCUMENTS

| | | |
|---|---|---|
| EP | 0589513 B1 | 9/1994 |
| EP | 0647069 A1 | 4/1995 |
| EP | 0677972 A2 | 10/1995 |
| EP | 1333684 A2 | 8/2003 |
| WO | 2002085037 A1 | 10/2002 |
| WO | 2011107905 A1 | 9/2011 |
| WO | 2014041471 A1 | 3/2014 |
| WO | 2014056679 A1 | 4/2014 |
| WO | 2014128586 A1 | 8/2014 |

* cited by examiner

SATURATION PROCESSING SPECIFICATION FOR DYNAMIC RANGE MAPPINGS

CROSS-REFERENCE TO PRIOR APPLICATIONS

This application is the U.S. National Phase application under 35 U.S.C. § 371 of International Application No. PCT/IB2015/066294, filed on Jul. 16, 2015, which claims the benefit of European Patent Application No. 14188425.4, filed on Oct. 10, 2014. These applications are hereby incorporated by reference herein.

FIELD OF THE INVENTION

The invention relates to methods and apparatuses for encoding an image or video (sets of still images) which can handle an increased luminance dynamic range compared to legacy image/video coding technologies, in particular, novel ways to specify how the color saturation of a second dynamic range image derived from a first dynamic range image (the two varying at least a factor two in luminance dynamic range) should deviate by saturation processing when deriving the second image with its second dynamic range. The invention also relates to saturation processing which is well-tuned to image processing chains involving mapping of images of considerably different luminance dynamic range (at least a factor 2, but it could be just as well that one needs to reduce the dynamic range by a factor 100, from a 10000 nit to a 100 nit image, or vice versa).

BACKGROUND OF THE INVENTION

Saturation is a more difficult technical quantity than it would seem to lay men who get a small part of the story. Psychovisually, it is one of the meaningful properties of a color (of an object) that can be derived by the brain having an eye with three different cone types. Photometrically/Colorimetrically, it is a measure of how close a color is to a monochromatic spectrum of the same hue, or in other words how far it is from white, and then it is typically called purity. There it relates with such physical properties like e.g. an amount of colorant in an outer layer of an object. Mathematically for image color processing technology, it relates to some radial axis processing in some color space, by moving closer to or further away from some white. And this processing has to model how nature generates purities, and more specifically, how humans would perceive them. Furthermore, since colorfulness is dependent on luminance, the brain can derive three kinds of "saturation", which are called colorfulness, chroma, and saturation respectively, but in this text for simplicity we will use the word saturation, as it will be clear to the skilled person what we mean.

Because another source of "complexity" is that saturation processing (and definitions) can be done in all kinds of spaces (with cylinder respectively cone or biconal shape), some of which are inherently scaled to the gamut extent, but have a deformed relationship compared to the linear nature of light, and others which may be simple, but can lead to clipping, especially because of the non-linear tent shape of 3 (or multi) primary additive displays.

Prior art has yielded a body of general saturation teachings, which were logically mostly concerned with image processing, usually the beautification of images. If one models human preferences for images, then one thing which stands out generally is that humans oftentimes prefer highly saturated images. Of course also desaturated pastel images may be beautiful, and hence color technology needs to be able to make those colors too. And, do so given the particulars of a technology, which we will assume here (non-limiting, for simplicity of elucidation) to be that of additive displays.

There was also specific prior art in the area of camera capturing, and formatting the captured images in the limited gamut of a standard image format, like e.g. PAL. Note that all saturation-related prior art is going to have at least some similarities. One should note that because saturation works in a gamut along outwards direction from the (zero saturation) luminance axis, all equations will likely have some form of the type color component minus unsaturated luma component. However, differences between some coordinate system with e.g. two particular chromatic dimensions versus some three-dimensional specification of the mathematics, and in particular linear versus non-linear color representations and the handling of color transformations in those respective spaces, may have very different colorimetric behavior, i.e. need to be contemplated with care, and hence are not trivially transformed into each other. It should also be understood that a mathematical transformation applied may be linear, e.g. a color matrixing, but if it is applied in a non-linear space, the final colorimetric behavior is still non-linear (because of the extra non-linearity of the transformation to that secondary color space, the physics of light and colorimetry ultimately being linear, as representatble in e.g. some linear RGB representation which can be used to stimulate the primary conopsin reaction in cones).

EP0647069 deals with a system for correctly formatting camera output in regions of higher brightness, so that e.g. no or reduced facial discoloration happens. These cameras have a so-called soft-clipper or knee circuit (FIG. 1, 2) on the luma component, to diminish yet keeping a little bit of the highlights. One should also mind that older type cameras based on scanning might have had a somewhat more non-linear overflow behavior, but CCD cameras would typically have a full-well limitation already, but still, such knee behavior could still help to keep a few highlights in the image, whilst not darkening the main part with the actors too much. In terms of this kneeing system behavior, this patent then adds a saturation-affecting circuit part. Firstly we'd like to note that these systems were not really intended to optimally handle HDR scenes, which might have higher brightness regions which are 10 or even 50 times brighter than the main brightness region on which the camera exposed. One kept a soft knee but clipped most of the really brighter regions to white anyway with that circuit. Secondly it is important to understand, that such cameras use non-linear R'G'B' color components, and a non-linear luminance component Y', which we will call for clarity luma (because that is what the YUV of PAL is). This means that the colorimetric behavior, whether in the upper parts of the encodable color gamut or anywhere else, will be different, and circuits even if somewhat similar will not be equatable. Lastly and most importantly, this system just gets whatever K-factor comes out of component 7 (and which is certainly not solely a function of V-Y), but definitely has no means to set a specification as desired by a grader, i.e. any particular saturation-modification behavior, as the specific nature of the current e.g. HDR shot may desire.

DE19812526 is another color saturation modification circuit which of course works on color difference components (again non-linear ones because that is what the standard nomenclature PR and PB stands for), but in addition to the above differences again, like a not allowing for a human-specifiable saturation gain, this patent works only on two color differences and is even further removed from any usable teaching towards our below described technologies. It was well-known that such "UV"-type saturation circuits existed priorly, because it was a very cheap convenient manner to do some saturation processing in a television which already got YUV video as input, i.e. before conversion to the required RGB for controlling the display.

EP1333684 is merely a specific saturation processing method for a display, which guarantees that the largest possible saturation boost doesn't clip. It was well-known that by boosting a color component, which may decrease a color component below 0, or create a luminance above Ymax, or create any undesirable color, which is (or rather should be because the electronics will clip it to an incorrect value) outside the RGB gamut of all possible definable colors, i.e. cannot actually be rendered on a television. The result of the clipping to a color which is displayable, but wrong, will have effects on the luminance or even the hue of that color, i.e. show it as a different hue from what it is supposed to be. That can be an annoying error, especially compared to a (small) desaturation. These kinds of system are typically for small errors, e.g. do to noise or filter behavior [0007], but not involved with potentially large e.g. desaturations needed for dynamic range conversion. This leads to several differences, e.g. that they monitor a maximum Ymax, which our below methods don't do, and in principle we can with the below methods design saturation strategies which do go outside gamut (i.e. clip) for a considerable amount of image colors, all depending on what the human color grading judges suitable for this image being processed. In addition to all that of course also the same differences like with the first mentioned patent exist, in particular that there is no means taught or even vaguely inspired for allowing a human to determine a specific (V-Y)-based saturation strategy, let alone for optimal coding of two image looks of considerably different dynamic range on a range of display peak brightnesses which should be supportable with an optimally graded image of a HDR scene.

EP0677972 is about handling colorimetric behavior above a particular set reference value s (again in a non-linear color space, NTSC, which was the television color space in Japan in the 90s). As can be seen in FIG. 3C, although the circuit comprises a saturation part, it is not about regulating a saturation behavior if not everywhere at least in a substantial part of the color gamut, but only in the highest tip of the RGB gamut. Of course having different design rationale etc., a very different technical system and teaching comes out. E.g. in one circuit embodiment there is a maximum detector, but of R'G'B' rather than R-Y, G-Y,B-Y, which gives very different numerical values, and even globally very different colorimetric behavior for different reasons.

U.S. Pat. No. 7,743,114 is yet another particular, irrelevant for our purposes, manner to create a saturation strategy which doesn't allow out-of-gamut problems which give severe colorimetric errors. As shown in FIG. 3, it deals with the fact that if one applies saturation processing mathematics in YCrCb (which is the non-linear digital equivalent of YUV), one may get colors which although still existing, i.e. representable, in a [0,255] YCrCb cube, again correspond to unrepresentable RGB (one can verify that even slightly rotating a cube of the same dimensions would already lead to regions codable in one cube which fall outside the rotated one). So one must be careful not to saturate too much. It happens that one can guarantee to use an appropriate maxsat by checking two conditions which correspond to lines, which are mathematically however very different from what we describe below, and again miss features like speciafibility of any desired g(V-Y) function, etc. Or stated yet in another manner, none of the colorimetric behavior as we have in e.g. FIG. 5 is realizable with any of the above circuits, even in case of the very simplest imaginable g(V-Y) specifications.

The below invention embodiments were worked out in particular in a framework of newly emerging high dynamic range image handling (processing and in particular coding for sending over wired or wireless video communication networks to receivers in other long distance or short distance locations, such as home computers, consumer TVs, settop-boxes, but also e.g. professional movie theatre video receiving apparatuses etc.).

U.S. Pat. No. 8,218,625 describes a method to communicate both an LDR image and a HDR image to a receiver. However, the method only seems to disclose the requirement for tone, i.e. luminance remapping, and not what should be done with the colors, let alone a need for a specific way of handling color saturation as in the present application. Furthermore the method of '625 would seem to communicate the HDR image as an LDR image plus an image of ratios (L HDR/L LDR), i.e. seems to be at least prima facie an incompatible approach with the one we envisage as a useful HDR encoding application for our new saturation processing, i.e. it is not prima facie clear how it would relate to or lead to any of our below embodiments.

The requirements for this field of HDR video technology are different than what off-the-shelf saturation knowledge can cater for. In particular, we have developed a HDR video encoding framework which can encode a number of images (for one time instant of presentation) intended for displays of various dynamic range capabilities (in particular peak brightnesses of say 5000 nit, 1200 nit, and 200 nit), which bundle of images encoding needs to actually transmit only one image (per time instant) for a reference dynamic range of e.g. 1500 or 1000 or 100 nit, and as metadata a number of functions which are used at the receiver side e.g. in the settopbox to calculate at least one second image, e.g. for a connected display of 700 nit (see WO2011/107905, WO2014/041471, WO2014/056679). E.g., consider we transmit or store for later use an image optimally color graded by its creator for presentation on a 5000 nit High Dynamic Range (HDR) reference display, which image is supplemented with metadata color mapping functions for deriving a 100 nit image for rendering on an Low Dynamic Range (LDR) display. The receiving e.g. television of 100 nit peak brightness, will apply those color mapping functions to the 5000 nit HDR image, to get its appropriate 100 nit LDR image. That LDR image, or rather the metadata functions functionally encoding it, was typically also color graded by the creator as an image which looked reasonable on LDR displays (e.g. a close approximation of the HDR image rendering on a HDR display, given of course the limitations of an LDR display). We have elaborated a number of luminance mapping functions for mapping the luminances of pixels in the two images of different dynamic range, since primarily dynamic range mapping is an optimization giving the original luminances of objects in a e.g. HDR image corresponding luminances in the range of possible LDR luminances (the other way around mapping LDR to HDR is of course similarly possible, with different mapping functions). Dynamic range mapping is a general color mapping problem, not just involving transformation of the luminance color component. E.g., as said above, the colorfulness of an object depends on its luminance, so if we need to map because of gamut/dynamic range technical limitations or artistic choices the luminances of an object in the first image to darker luminances in the second image, then the creator may want to combine this with a boost of the saturation of that object. Also, because the tent-shaped gamut of a (e.g.) 3-primary additive display is rather complex, and pointed as a function of luminance, it may be useful if also for that optimization color control is possible.

However, especially when the metadata needs to be co-encoded and transmitted, there are technical limitations leading to solutions which would be more or less practical. So if any color processing methods or apparatuses have to be consistent with potential remote communicated specification of color processing, they have to conform to those limitations. Even more so because some of the video communication modes in the various different technologies needing HDR video coding (e.g. HDMI) may involve a limited bandwidth or number of data words per image to transmit any metadata. So one must smartly chose which functions are transmitted, since in this framework they determine which images can be encoded, but also determine how reasonably or unreasonably complex the receiving integrated circuits should always be, since they have to do the color mapping. Moreover, the functions also form a toolbox of functions allowing a grader to encode new dynamic range looks for his image content, so those tools should not be too few, nor too many, not be too complex, and in particular have a good major order impact on the color transformation of the image, in particular those aspects which are mostly needed for dynamic range transforms.

It was a problem that neither such adapted color processing tools, nor knowledge sufficiently inspiring how to develop them, was generally available, so we had to develop them. In WO2014128586 we introduced a saturation processing definition as function of a brightness variable like luminance, but we desired another useful saturation adaptation definition, and we will describe embodiments below.

SUMMARY OF THE INVENTION

Our below described embodiments solve most of the issues of previously not having a simple saturation specification strategy which was well in tune with the needs of luminance dynamic range converting color processing being able to handle sufficiently different and/or sufficiently large dynamic range images (e.g. with object pixel luminances up to 1000 nit, or even above that), in particular by means of a color saturation modification apparatus (101) arranged to determine three linear color differences (R-Y,G-Y,B-Y) defined as a linear additive primary color component of an input color (R,G,B) minus a luminance (Y) of the input color, and to do a multiplication of the linear color differences (R-Y,G-Y,B-Y) with a gain (g), characterized in that the apparatus is arranged to determine the gain from a function depending on a difference value (V_in-Y) being defined as the value of the highest one of the linear color differences (R-Y,G-Y,B-Y), and the apparatus being arranged to add the luminance (Y) to the result of the multiplication of the linear color differences (R-Y,G-Y,B-Y) with the gain (g), yielding an output color (R_out, G_out, B_out). Saturation processing by doing a boost of (two) color differences was known, as it is tightly linked to the definitions of saturation as introduced in the introduction of this patent application, so we see a color-difference-related part again in our method, but it was difficult to find a simple good specification of the saturation along the color gamut, which fulfilled the needs of quick and powerful grading, both to save on precious time for the grader, and calculation complexity for decoding ICs in various possibly cheaper apparatuses which need to use high dynamic range images, such as e.g. tablet displays. One difference which should be pointed to, is that the classical saturation processing methods, one defines a cone or cylinder with the luminance or luma as a first axis, and two chromatic difference axes defining the chromatic component of the pixel color (which roughly corresponds to the actual psychological impressions of hue and saturation), whereas we apply the processing on three color components. Of course a major difference is that our gain is specified in a very different manner than the usual orthogonal to the luma axis definition, or usually just a fixed boost, which gives very different colorimetric behavior, which is however better tuned to problems of dynamic range conversion, which most complexly occur in the narrowing upper part of all RGB gamuts. This new saturation processing method appropriately bends to that. The surprising V-Y index or input coordinate for the FC(V-Y) function was introduced, surprising for anyone skilled in color technology since one would think that saturations always should happen largely orthogonal to the achromatic luminance axis, and so even when variable for different actual pixel luminances, this way of specifying saturation strategies would seem very counterintuitive to colorimetric technologists at first sight, since along the achromatic axis V-Y is zero everywhere, but, given that achromatic colors needn't be processed anyway, this saturation specification method seemed to have very nice properties in practice. So the color grader will specify his optimal chromatic color processing strategy as (for constant hue typically, although of course one could for certain applications modify the basic method into a more sophisticated one, e.g. taking care also of some hue-dependent variation; but for most applications our method only needs a function of the V-Y parameter) a 1-dimensional saturation modification specification, which varies based on the V-Y values for any color in the color gamut. So by specifying any such function F(V-Y), the grader also specifies a particular color saturation modification behavior for an input image, as seen in the resultant output image. Interesting practical F(V-Y) specifications have only a few (e.g. 2 or 3) e.g. linear segments, e.g. a part in which the saturations are boosted, and a part of the range (and corresponding part of the color gamut) in which the saturations are decreased, but of course more complex specifications can be made, to re-grade a particularly complex HDR scene. In general there is a mechanism to specify a function, and the grader can then select how complex he wants to make, and encode this function. In a typical larger system, the grader can actually visually see what he is specifying (e.g. on a LDR display via image communication interface 288, e.g. HDMI), and choose a final specification as artistically desired, e.g. because it gives appropriate LDR image looks under a situation of a particular kind of HDR input (e.g. a scene of a dark basement encoded in a native format with luminances up to 10000 nit). Although this should be clear to the skilled reader, we'd like to emphasize that this color processing, in whichever embodiment configuration i.e. e.g. to convert an input image associated with a display of a first dynamic range to an image suitable for driving a display of another dynamic range, can be used both to convert from a higher dynamic range to a lower one, or oppositely from a lower dynamic range to a higher one (e.g. 100 nit to whatever codec or display peak brightness). But the method is especially useful for converting to lower dynamic range(s). Also, one can specify the function so that it increases, or decreases the saturation, and, possibly differently depending on where the color lies in the gamut. In case the unit for specification and the color calculation unit are in different e.g. ICs, then there may be a bus 289 between the units for communicating the F(V-Y), and in software-based version on a single processor or similar, this may equivalently be realized by procedure calls, etc.

Additive primaries are primary colors that span a gamut of colors that can be made by mixing a percentage of each primary, whereby mixing 100% of each primary gives a predefined white color, e.g. D65. Linear additive primary-defined color percentages behave as a linear vector space, as if the primary indicates a number of photons of a certain primary color (in fact from a particular spectrum of the primary) of the primary. This has certain properties regarding e.g. the constancy of a hue in a mix etc. This should be contrasted with non-linear representations, which have very different color mixing behavior. Such non-linear coordinates can be defined e.g. by applying typically a function which is approximately a square root, i.e. R'=sqrt(R), etc. (whereby the dash is conventionally used to denote the non-linearity to differentiate from the linear additive red primary R), or in fact any other non-linear function of the linear additive color component. Of course mathematically, one can also define any color processing like e.g. a linear matrixing in such a non-linear color space, but the chromatic appearance of any set of colors processed in such a non-linear manner—e.g. a saturation-modification processing—will be different from a linear color processing. A luminance of a color is by definition a linear combination of the primaries, with weights depending on the chosen RGB coordinate system, i.e. the primaries and the required white point. A corresponding combination with the same weights of the non-linear primary components also exists, but that is called a luma Y', and as said, that color representation and the mathematical color transformations in it has very different colorimetric behavior, and cannot be used similarly mutatis mutandis for a particular colorimetric task. I.e., one needs to seriously contemplate which mathematical transformation to use in which case, and may need to even more laboriously need to contemplate how to emulate e.g. some color processing behavior in a non-linear representation in a linear one or vice versa. Some color transformations, like in the old day circuits of analog television were designed with other primary considerations, e.g. calculation simplicity favored over color accuracy, than what present day technologies may need.

Further useful embodiments are inter alia a color saturation modification apparatus (101), characterized in that it comprises a data input (108) for obtaining a saturation modification specification function F(V-Y) of the gain (g) as a function of a difference value (V_in-Y) from an apparatus for determining that specification. Various connected or separate apparatuses can specify such a function and communicate it to the color processing unit. In particular, the both may be comprised in an apparatus for verifying the action of the color transformation, such as in an image or video encoding apparatus. Typically a grader will specify, by e.g. shaping the function with control points, at least one time, and possibly as many times until he is satisfied with the color transformation of the saturation processing, in particular the look of the (e.g. LDR) output image. A final function FC can then be used for the upcoming real-time processing, stored in a memory for later processing, like e.g. when processing a batch of images, communicating over any communication technology, for e.g. enabling any receiver doing the image processing, etc. The skilled person will understand which equivalent variants can be used depending on the scenario, e.g. a standard can reserve a number of integer or real number placeholders, to put in a number of function specifying parameters, like e.g. a single gain, which could be an average in case the gain varies, a first coefficient containing e.g. a demarcator on the V-Y input axis where a first segment ends when starting at 0, and a slope number in case this is a linear segment, and in case the function is too complex and needs too many parameters, the standard may store the FC data in a LUT instead, etc. Any such saturation handling apparatuses (e.g. a part of an IC, or software running on an IC) could determine a good saturation strategy by themselves, i.e. even a decoder in a television could determine and apply it in e.g. an autoconversion strategy to make the colors of an incoming image nicer. Yet the saturation modification is of particular interest as a component in technologies where various looks of a scene for various dynamic ranges of displays on which the respective looks have to be rendered are specifically encoded, by colorimetric transformations of at least one received image per presentation time instant, which colorimetric transformations involve saturation processing.

Thereto it is beneficial to have an image encoder (201) for encoding at least one high dynamic range image (HDR_ORIG) for at least one time instant, and at least one image (Im_LDR_out) of a second dynamic range which is different from the one of the high dynamic range image by at least a factor two for the same time instant and arranged to encode a matrix of pixel colors for at least one of those two images, comprising a specification unit (212) comprising a color saturation modification apparatus (101) as claimed in claim 1, and a saturation specification unit (204) arranged to specify a saturation modification specification function F(V-Y) which encodes gains (g) as a function of a linear color difference value being defined as the value of the highest one of linear color differences (R-Y,G-Y,B-Y) for a pixel color (R,G,B) which linear color differences are defined as the respective linear additive color component minus the luminance of the pixel color, so that the function can be used to calculate a gain for any highest linear color difference of a pixel being color processed and therewith calculate a color saturation change for the pixel, and the encoder comprising a formatter (210) arranged to output in an image signal (S_im) an encoding of an image (Im_i-n_DCT) comprising the matrix of pixel colors, and as data the function F(V-Y). In this encoder, the gain-based saturation processing forms part of the colorimetric transformations that need to be applied to obtain the look for the displays of different dynamic range, higher or lower than that of the input image. Typically an apparatus for determining the encoding, if it makes use of the input from a human grader, will have a UI-based specification of at least one function F(V-Y), supply that saturation specification function to the color processor to do the color transformation and allow the resulting output image to be inspected by the grader, and if the results are satisfactory finalize the grading-based encoding by e.g. formatting all describing data of the function in a metadata field associated with the pixelised image encoding, and stored or transmitted as an image signal, which can make any receiver do the same calculations to obtain the pair of images of lower and higher dynamic range, or, if the saturation transformation is done within the same dynamic range, the output e.g. LDR image. It should be clear that any encoder doing some kind of verification of what the encoding will look like, will comprise the basic saturation processing core of this invention. In any case, any decoder must comprise it, since it needs this defined way of changing the image look to be able to redetermine the second image, i.e. e.g. the LDR image which was not actually co-encoded as a pixelised image, but only as a specified color transformation to be applied to the communicated HDR image. In this manner, together with luminance-based color transformations, an image of e.g. 3× or 10× lower dynamic range, typically lower peak brightness, is obtained.

As said, the saturation processing is particularly interesting in HDR image processing scenarios. In particular we have previously invented a HDR encoding framework, which does not necessarily encode one sole HDR look (i.e. e.g. an image to be presented on a 5000 nit display, which means it will look optimally on that display, yet, although of course being just an image it can also be directly rendered on other displays of lower of higher peak brightnesses, but because those displays don't match with the artistic intention, the image will not look optimal anymore, e.g. some parts will look too dark), but can encode a bundle of such looks for various intended displays (which we call display tunability). In such a technology only one of the range/look images actually needs to be encoded and transmitted (for each time instant T for video), e.g. the 1500 nit one, and the others are then calculated at the receiving side by applying functions. E.g. first functions map this to a reference 100 nit peak brightness dynamic range, and a second set of functions map it to 5000 nit. And a mapping to 3000 nit can also be done at the receiving end by correctly interpolating all the received information. In such encoding strategies one wants to specify the saturation change when going e.g. from 1500 nit to 100 nit, or from 1500 nit to 5000 nit, and for that the present saturation modification embodiments are highly useful. So the saturation processing forms part of the functional definition of one look (e.g. an LDR Im_LDR_out) as a function of another look (e.g. a previously made master HDR look HDR_orig), and can be used for deriving the second look by a receiver, whichever one of the two (sets of) images is actually sent to the receiving side, with metadata comprising the color transformation functions definitions. In addition to the saturation processing there will be a luminance-direction color transformation, which may in the functional definition of the second image e.g. be applied prior to, or after the saturation processing. We note that in HDR processing one needs higher non-linearity for the definition of the luma code values than gamma 2.2. If one wants to use a particular good looking graded image which doubles as a code allocation function, the non-linear luma transforms in such an application may even be more highly non-linear, e.g. an S-curve. E.g., one may communicate a LDR non-linear image of a linear HDR scene.

On any receiving side of the information which was previously determined on a transmission or creation side, the new technology may be used in an image decoder (301) arranged to be able to decode at least two images (HDR_ORIG, Im_LDR_out) of at least a factor two different luminance dynamic range for at least on time instant, at least one of the two images being a high dynamic range image (HDR_ORIG), the decoder comprising a color mapper (304) arranged to derive one of the two images by applying a received luminance transformation function (FT) and a received saturation modification specification function (FC) to the other one of the two images which functions are received via an image input (310), characterized in that the color mapper comprises a color saturation modification apparatus (101) as according to our basic new saturation definition concepts (claim 1 or embodiments) for modifying color saturation based on a specification specifying a saturation multiplier as a function of the difference value (V_in-Y) of pixel colors, and by applying these color transformations obtaining the derived one of the two images. This encoder is new not only in that it is able to do this new saturation processing, but also in that it is the only manner to obtain different looks which are uniquely defined based on such colorimetric redefinition of the colors (which may typically happen in a normalized coordinate system, in which R,G,B and Y are between 0 and 1, but the exact color locations in that gamut determine the artistic appropriateness of any look or grading of a particular HDR scene).

So this specific saturation processing, apart from being useful in general as an image processing, was realized by the inventor to be especially useful for defining images, if one has a technology where one needs to encode at least two looks on a HDR scene, which two looks are images intended for displays of significantly different dynamic range (e.g. a legacy 100 nit peak brightness, and a 5000 nit, or a 1000 nit), and whereby one would like to avoid communicating the pixel textures of both images (or at least, maybe some pixels may be sent in a second image, avoid that both images need to be communicated to a receiving side in full). The second look artistically graded, will then by derived mathematically from the first, which is actually communicated as an image comprising an encoding of the colors of sets of pixels, e.g. by a DCT-based coding like JPEG, or an MPEG variant or the like. In particular, in this framework the artistic desires of the content creator are taken into account, since he is specifying the second look, which is also actually coded by the color transformation for communication, but at the same time also specified, because at the encoding side he is selecting the optimal saturation change strategy as codified in FC(V-Y). At the decoding side this information is then used to be able to uniquely determine the second look image, e.g. non-limitingly a LDR image from a communicated HDR one. Note also that it can be technically advantageous to first to the color, i.e. saturation modification, and afterwards the luminance transformation part. E.g. if this chromatic transformation creates some designed headroom in the luminance direction, then different kinds of luminance transform can be applied, which may sometimes be critical in dynamic range compression, e.g. in conversion to LDR when several important bright objects have to be crammed in the top of the RGB gamut tent. This may be especially interesting for some kinds of scene, e.g. containing stained glass windows, etc.

Interestingly the embodiments of the various color handling technologies, like color processors, decoder, or even encoders may be comprised in a display apparatus such as a television, or movie theatre projector, etc.

A useful embodiment is a method of color saturation modification comprising determining linear color differences (R-Y,G-Y,B-Y) defined as a subtraction of a luminance (Y) of the input color from the respective three linear additive primary color components of the input color (R,G,B), and multiplying of the linear color differences (R-Y,G-Y,B-Y) with a gain (g), characterized in that the method is arranged to determine the gain (g) as a function of a difference value (V_in-Y) being defined as the value of the highest one of the linear color differences (R-Y,G-Y,B-Y), whereby the method furthermore adds the luminance (Y) to the result of the multiplication of the linear color differences (R-Y,G-Y,B-Y) with the gain (g), yielding an output color (R_out, G_out, B_out).

Another useful embodiment is a method of image encoding comprising:
receiving an input image (HDR_ORIG) of a first luminance dynamic range;

applying a color transformation to the input image to obtain an image of a different second luminance dynamic range (Im_LDR_out), which is different from the first dynamic range by at least a factor two; and outputting an image signal (S_im) comprising one of the input image (HDR_ORIG) and the obtained image of the second dynamic range (Im_LDR_out), and metadata (FC, FT) specifying the functions used in the color transformation, characterized in that the color transformation comprises applying a method of color saturation as specified in claim 6, and the metadata comprises a saturation modification specification function specifying gain values for various values of a difference value (V_in-Y) being defined as the value of the highest one of the linear color differences (R-Y,G-Y,B-Y) of a pixel color (R,G,B), the function being usable to determine a gain value corresponding to the color (R,G,B) of a pixel to be color processed. The gain will then be determined according to what was prescribed in the functional specification F(V-Y). It should be clear to the skilled reader that the gain equates with a color saturation modification, and, in some embodiments that may be part of a definition or in other words encoding of an image in terms of another image.

This corresponds at a receiving side with a method of image decoding comprising:

receiving an input image (HDR_ORIG) of a first luminance dynamic range;

receiving a specification of a saturation processing defined as a function of the difference value (V_in-Y) as claimed in claim 6;

applying a color transformation to the input image to obtain an image of a second luminance dynamic range which is at least a factor of two different (Im_LDR_out); and outputting the image of a different second luminance dynamic range (Im_LDR_out), characterized in that the color transformation comprises doing a saturation modification as claimed in claim 6.

The invention may also be realized in a communicatable image signal (S_im) which is encoding at least two images of different dynamic range, at least one of the images being a high dynamic range image, the image signal comprising an encoding of a set of pixels one of the at least two images, and function metadata specifying the color transformation functions to be applied to derive the other one of the at least two images, characterized in that the function metadata comprises a function specifying gains for various values of a difference value (V_in-Y) being defined as the value of the highest one of three linear color differences (R-Y,G-Y,B-Y) of a pixel color (R,G,B), which linear color differences are defined as the value of the respective linear additive primary color component of the pixel color minus the luminance of the pixel color. This signal can be stored, transmitted, used, etc. This signal then comprises all data to be able to decode the second look or graded image from the first one (i.e. both typically having a significantly different luminance dynamic range), comprising the fact that the inventor realized that the new saturation mapping can be used very well in the definition, i.e. co-encoding, of at least one other dynamic range image based upon a sole transmitted actual pixelized image encoding.

Any memory product (299) internal to any apparatus, or detachable and separately distributable, comprising a memory for digital data bits, characterized in that the memory is filled with the novel image signal (S_im) codifying the specific simple saturation modification strategy.

As the skilled reader will realize, all embodiments can be realized as many other variants, methods, signals, whether transmitted over network connections or stored, computer programs, etc.

BRIEF DESCRIPTION OF THE DRAWINGS

These and other aspects of the method and apparatus according to the invention will be apparent from and elucidated with reference to the implementations and embodiments described hereinafter, and with reference to the accompanying drawings, which serve merely as non-limiting specific illustrations exemplifying the more general concepts, and in which dashes are used to indicate that a component is optional, non-dashed components not necessarily being essential. Dashes can also be used for indicating that elements, which are explained to be essential, are hidden in the interior of an object, or for intangible things such as e.g. selections of objects/regions (and how they may be shown on a display).

In the drawings.

DETAILED DESCRIPTION OF THE DRAWINGS

Figure 1:
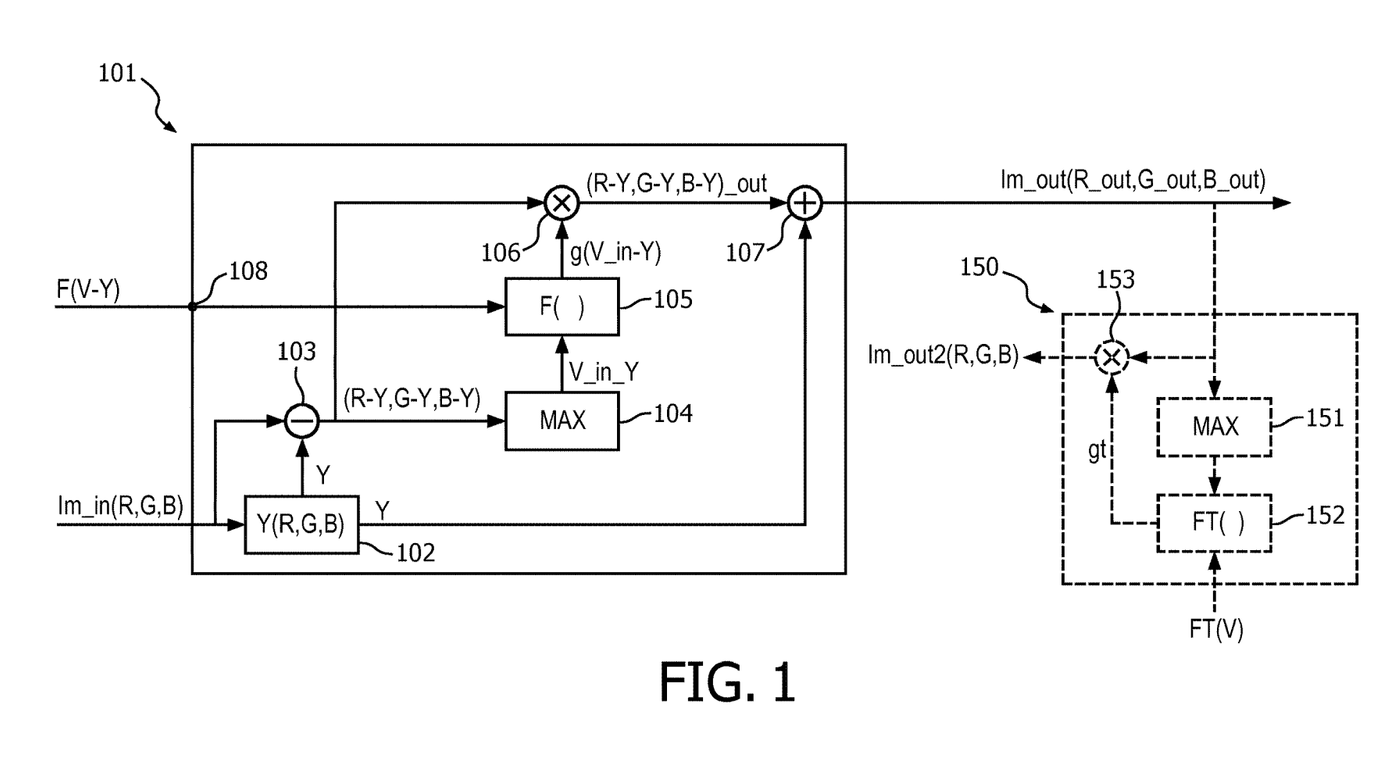
FIG. 1 schematically illustrates the new saturation processing apparatus, optionally connected to a luminance processing strategy (the two color changes being substantially decorrelated)

FIG. 1 schematically shows a basic color saturation modification apparatus 101 according to the present invention. This apparatus 101 may e.g. be a processing unit of an IC for color processing, e.g. as we will assume in the below exemplary elucidation, comprised in an encoder for HDR video encoding or a decoder for HDR video decoding. It gets an input image of pixels with colors which we will assume are linear red, green and blue (RGB) colour components, for some color space like e.g. sRGB. The skilled person will understand how variants can exist, e.g. if gamma-space YCrCb pixel colors of an MPEG encoded image come in, there may be a preprocessing unit connected (not shown) for doing color conversion to this linear RGB color representation. Luminance calculation unit 102 calculates a luminance of the color, dependent on the color primaries of the used color space. E.g. the equation it uses may be $Y=0.2126*R+0.7152*G+0.0722*B$ (for Rec. 709) or $Y=0.2290*R+0.6917*G+0.0793*B$ (for DCI P3 wide gamut), both for D65 white point. A subtracter 103 derives linear color differences (e.g. R-Y is obtained by subtracting the pixel luminance from its red color component, etc.). A maximum determination unit 104 evaluates which one of the 3 color differences R-Y, G-Y, B-Y is the highest for the currently processed pixel, and outputs this value, e.g. R-Y. We will call the whichever of the 3 is the highest V_in-Y. This value is needed because our saturation strategy defines how much saturation or desaturation should be done based on the V_in-Y value of each image pixel. The amount of (de)saturation is indicated as a factor g for multiplying, and it is determined by a function F. This function could be calculated on the fly, but merely for this example we will assume it is read from a lookup table. This lookup table (or whatever data needed for enabling the evaluation of the function in general) F(V-Y) with index V-Y and output g, will typically be received externally via a data input 108, e.g. via metadata associated with the input image(s) Im_in(R,G,B), being previously generated by the content creator of those image(s). The resulting gain is multiplied with the color differences by multiplier 106, yielding output linear color differences (R-Y,G-Y,B-Y)_out for the pixel. Finally the pixel luminance is added again by adder 107, to yield an output pixel color, and an image Im_out(R,G,B) with such pixel colors, which has a different saturation for the pixels.

What we have also shown in FIG. 1, and what is not in general present when the present saturation technology is only used as an image recoloring function, but is typically present in a video encoding or decoding processing chain, a second processing which keeps the chromaticity of the color (or in other words its saturation) constant, but changes the brightness or luminance of the pixel. In particular, the luminance mapping unit 150 can give a different brightening (or darkening) for pixels with various pixel grey values (or actually max(R,G,B) values) along the range of possible grey values, by multiplying with multiplier 153 the input RGB values with gain values gt, which are evaluated by gain value determination unit 152 as a function FT of the maximum (calculated by maximum determination unit 151) of the input R,G and B values (denoted with V). This unit 150 giving a final output image Im_out2(R,G,B) actually implements what we described in detail in WO2014056679. Although various uses of this mapping technology are conceivable, such as e.g. mapping an intermediate 1000 nit encoded image to a 2000 nit image for display on a 2000 nit display, or upgrading a special 100 nit image which looks reasonable on a 100 nit display yet contains sufficient HDR texture information for transforming it functionally in a good quality 5000 nit image, we will elucidate the processing with an example of mapping 5000 nit master graded HDR (HDR_ORIG) to a 100 nit LDR, suitable for driving LDR displays of 100 nit peak brightness or peak brightnesses around that value. Suppose we have a HDR capturing of a church. The interior of the church is not too bright, i.e. slightly darkish but with everything well visible. The sunny outside world shining through stained glass windows is much brighter, making those colors e.g. 10 or more times as bright as the inside colors. But that is well representable in an HDR image, because it has sufficient dynamic range. Defining the meaning of a coding (ignoring with which electro-optical transfer functions lumas have been allocated to luminances to be rendered on the display, and just focusing on those luminances only) can be done by looking at their rendering on a reference display. So for the church, we could say it is well color graded, i.e. has a pleasing look, if on a 5000 nit display the inside colors are e.g. mapped on a 0-200 subrange of luminances, and the stained glass windows are rendered with luminances in the interval 350-5000 nit. The HDR display (and its corresponding encoded HDR image) can display such high values even for blue which has only 7% as much luminance as the white or peak brightness. I.e. it has the possibility of rendering (and the corresponding HDR images should hence encode those) colors that are at the same time saturated and bright. On an LDR display however, nothing bright and at the same time saturated is possible. Either we keep the saturation of the colors, but then they become dull (e.g. for blue maximally 7% of 100 nit=70 nit), or we try to make them brighter, but then suffer saturation of the colors, because moving up into the top of the gamut can only be done by desaturating colors. We assume that this was the grader's choice: "better a little less colorful windows if only I can simulate them as bright". This would be done by first desaturating with our unit 101 the colors towards the achromatic luminance axis (with constant luminance), and then we have room in the gamut top to boost the brightness of the desaturated colors (i.e. preferably solely or mainly for the stained glass parts of the image, i.e. their colors), with unit 150. If we processed the original non-desaturated colors with unit 150, we would quickly bump into the gamut upper boundary, and hence add little or no brightness (luminance) to the windows. So this is a typical interesting color processing variant associated with dynamic range transformations to lower luminance dynamic range, but when transforming a LDR image to a HDR image the same saturation processing could be used for other effects, e.g. making some objects or regions of the image more colorful.

The skilled person will understand how various color mapping for images can be realized in practice, e.g. in a single chain of processings per pixel, or different successive calculations on intermediate result images, etc.

Figure 2:
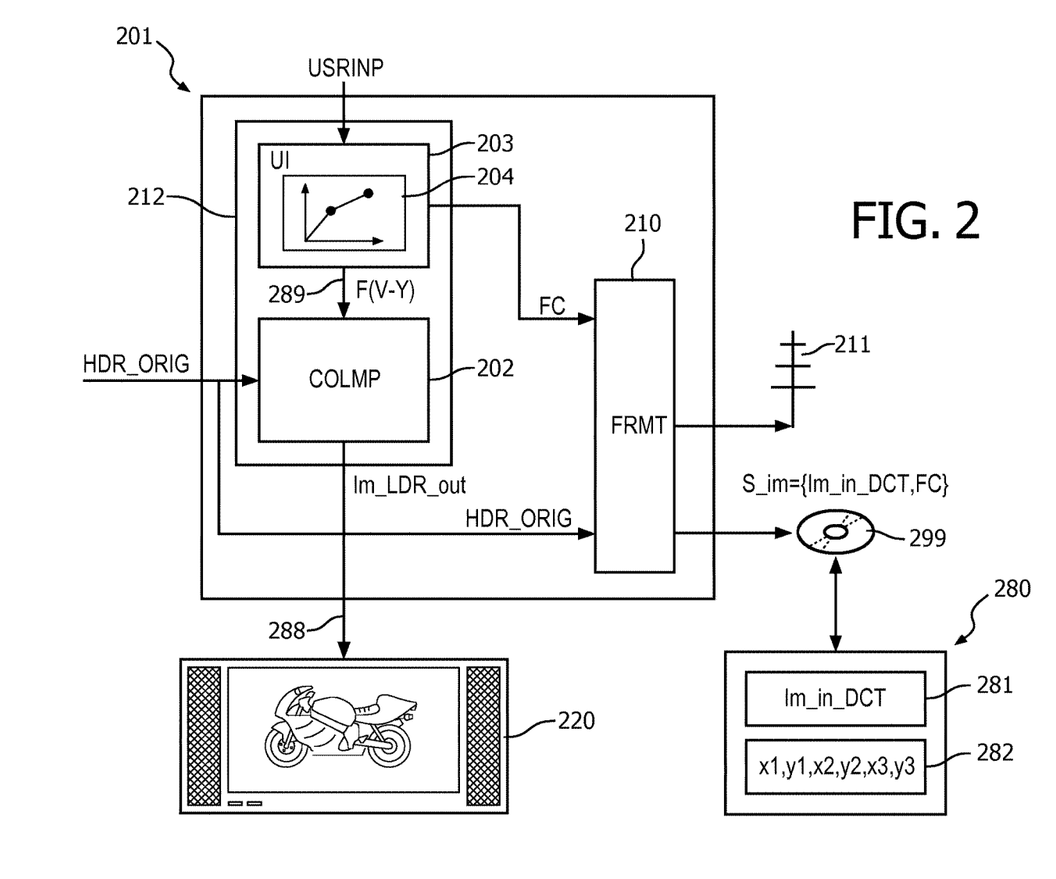
FIG. 2 schematically illustrates a possible embodiment of how an HDR image encoder comprising an embodiment of the novel saturation processing apparatus may be realized.

FIG. 2 shows how our saturation unit can be comprised in a encoder, for yielding HDR video. It gets as input an HDR grading image (HDR_ORIG). Again we elucidate with the example that the grader will make a corresponding LDR image, and use our saturation technology to determine the saturation of that LDR image. Color mapper 202 is arranged to apply our saturation mapping as in FIG. 1, and yield an LDR output image Im_LDR_out, the look of which can be studied on a reference display 220. Now the grader can specify his desired saturation strategy, e.g. as a multilinear curve specifying the functional mapping between V_in-Y and V_out-Y, as in FIG. 4, or otherwise. E.g., he may create a function by specifying the x and y coordinates of 8 control points in a [0-1],[0-1] coordinate system. Thereto the (image or video) encoder 201 comprises a user interface unit 203. It may implement various user interface functionalities, e.g. to determine the luminance reallocation of the various HDR image grey regions into grey regions in the LDR image, e.g. it may allow the user to specify regions of an image to be processed in a different manner from the rest of the image. But one of the comprised units will be a saturation specification unit 204. The user may specify his user input USRINP via known grading tool input devices like color grading keyboards, and/or a mouse, etc. E.g., he may draw a curve like in FIG. 4a. Color mapper 202 can then apply all specified color transformations, in particular the saturation modification. If the grader is satisfied with the LDR look, the function FC(V-Y) will be the one to use at a receiving side to recreate the appropriate LDR look image out of a received HDR image. Otherwise, the grader may try another F(V-Y) specification. We will assume the textures are encoded in the original HDR_ORIG, but we could also transmit e.g. the LDR image Im_LDR_out. The encoder then needs to collect and format all information by using formatter 210. It will encode the HDR-ORIG image as an MPEG-HEVC image, i.e. will calculate lumas according to a HDR EOTF function, calculate some chromatic color coordinates like CbCr or uv, do DCT transforms on the component images, etc. The metadata FC can e.g. be saved in dedicated SEI images, or similar metadata structures. The resulting image signal S_im comprising image data Im_in_DCT and functional color mapping metadata FC for obtaining at least one other look image for a different dynamic range display, may directly be sent over some network, e.g. broadcasted with antenna 211, or may in another embodiment be stored on a memory product 299, say a Bluray disk. FIG. 2 also schematically shows the image signal S_im/280 that the Bluray disk contains, which signal is logically composed of at least image data 281, and functional metadata 282.

As one out of many possibilities, we give the example where the formatter 210 encodes and formats the images and metadata according to an MPEG-family video compression standard, e.g. MPEG-HEVC, with 10 bit words for the HDR lumas.

Figure 3:
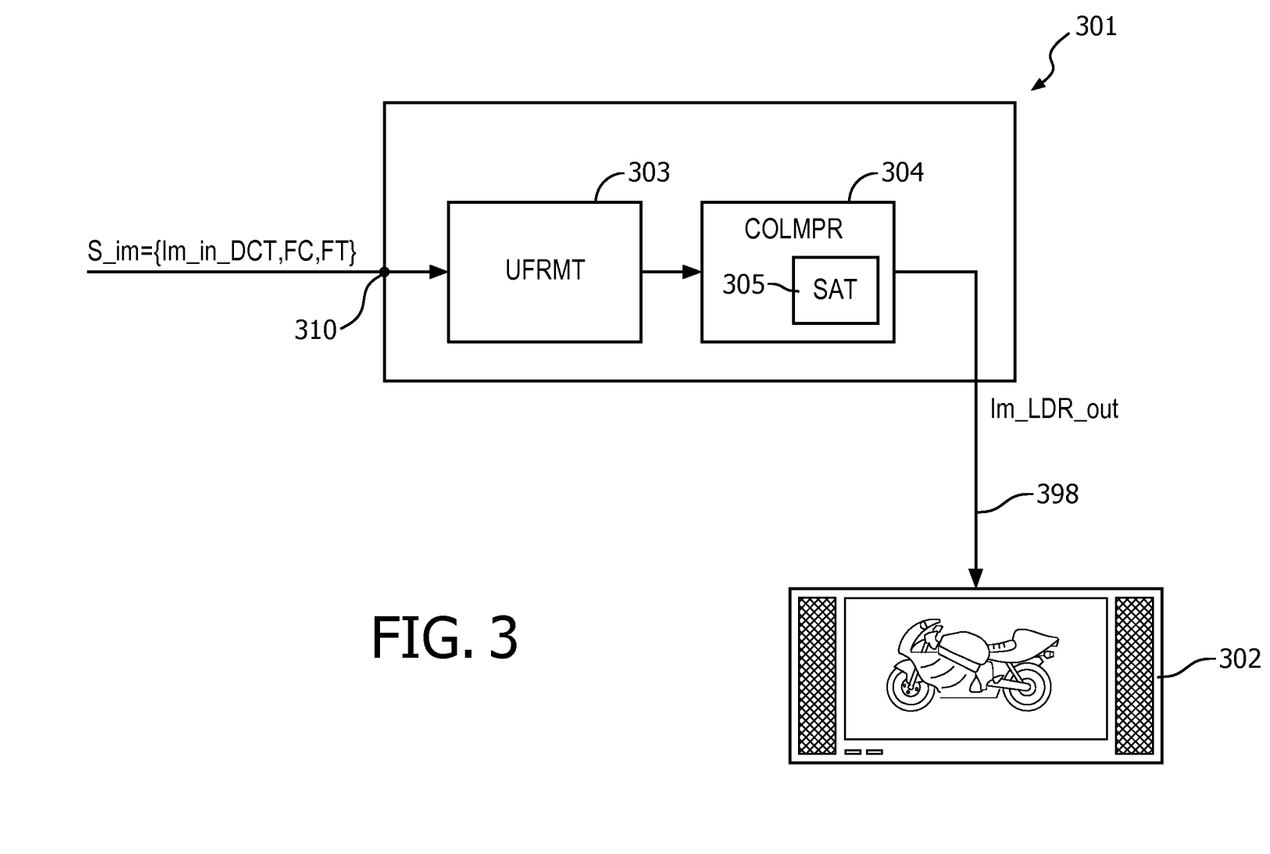
FIG. 3 schematically illustrates a possible embodiment of an exemplary HDR image decoder e.g. a decoder in a STB connected to a display in a home environment, the skilled reader of course understanding that similar to this other usage scenarios may be e.g. a medical system, military system, advertising system in a supermarket, entertainment system in a theme park, etc.

FIG. 3 shows how in a mirrored manner the encoded image looks may be decoded, and without loss of generality, we can elucidate the case where a receiver applies exactly the same saturation strategy FC, to obtain the appropriate image for a connected e.g. 100 nit display 302 driven via wired or wireless connection 398, on the basis of the received image signal S_im comprising an HDR e.g. 5000 nit image encoding Im_in_DCT, and mapping functions for transforming it to an LDR image, both a color mapping function for one of our present saturation processing embodiments, and a luminance mapping function FT specified as a function of V=max(R,G,B)_in. The decoder 301 will get its basic image encoding, and the mapping functions for the chromatic and luminance adaptation via an image input 310, which typically gets combined image data+ metadata image signals, and may be connected to various sources such as e.g. a DVB receiver, the internet, a BD reader, etc. In case the saturation processing functions in a standalone application such as image processing software, e.g. as a (pre)content generation method, the image source may be on a computer's hard disk etc. The decoder 301 comprises a deformatter 303 for undoing the MPEG decoding, and finally yielding a linear RGB representation of the Im_in_DCT with color components which we assume normalized to 1 for computational simplicity. The color mapper 304 will calculate the required LDR image, and it comprises our color saturation processing unit 305 as in FIG. 1. Indeed, in this example we will do exactly the same function FC as specified in the encoder to do the same downgrading the grader checked on display 220, but there can be other embodiments where one transmits a LDR image, which was created with FC, but needs to be upgraded with an inverse function $FC^{-1}$, or only a partial saturation change for a display with peak brightness between the one of the transmitted image, and the reference display corresponding to the image which the applied functions yield when applied to the transmitted image, etc. Note that typically the color mapping may also comprise a gamut mapping to the RGB gamut of the LDR display (for which the LDR image was graded), and the saturation processing will be done in that linear RGB space. Receiving side decoding apparatuses comprising our decoder 301 may be manifold, e.g. a settopbox preparing an image for a passive TV, or the color transformation may be done in the TV itself, and the decoding apparatus may generate optimal images for several connected displays of different peak brightness, etc. Of course the decoder and encoder may also be in several intermediate apparatuses, e.g. for transforming a first HDR image or video format in a second one, e.g. prior to transmission via satellite, or in a part of a cable system, or when transmitting a live news feed etc. Although we described an example of human color grader-tuned color mapping, the same technologies can also be done in an autoconverting color mapping unit, wherein the FC is e.g. determined mathematically by analyzing the properties of the images, such as e.g. looking at the histogram or otherwise determining which (how many, how large, . . . ) objects are in the brighter or darker subranges of the total luminance range. The specification unit (212) which actually does the generation of the FC function(s) may be different in the two scenarios. In case of user-generated saturation specifications, it will typically include user interface means to specify a functions, e.g. a graph on which one can draw a functional shape, e.g. by dragging control points, and the grader will be able to see the result, after applying the functions to the input image. When the specification unit is of the autoconversion type, there may be one or more image analysis units (not shown), but it may still be advantageous if the encoder shows the (e.g. single, or multiple propositions) automatically generated FC and/or FT, so that he can agree with the artistic quality of those by e.g. clicking an okay button. So the unit arranged to specify a function F(V-Y) encoding gains (g) may either be arranged to do a mathematical specification by itself, or comprise units allowing a human artist to do so. Or, instead of accurately specifying a multisegment saturation strategy, the color grader may just turn one single dial (even directly on a camera to yield appropriate HDR video output), which then mathematically changes the shape of the saturation definition function FC(V-Y).

In FIG. 4 we have given one exemplary simple embodiment, in which the grader needs to change only two parameters. To understand that better, the reader can first look at FIG. 5, which shows the equi-V-Y lines in a yellow-blue slice of the RGB display or codec gamut (shown schematically in a luminance uv-chromaticity representation). We see that the disadvantageous asymmetry of the gamut (7% maximum luminance for maximally driven pure blue vs. 93% for yellow), which makes luminance-based saturation difficult, is handled by having the V-Y lines scan through the colors in a different manner. The yellows correspond to smaller V-Y values, and the blues to larger ones, up to 0.93 for maximum blue (B=1, R=G=0). Now take the example of the stained glass window again. It may contain blue and yellow colors. One could desaturate the yellows, but that wouldn't yield much additional luminance (theoretically maximally 7%), yet it would lead to ugly desaturated colors. So we don't win on the one aspect of the optimal rendering in LDR of bright colorful objects, namely the brightness, yet we already severely lose the other aspect being the saturation/colorfulness. However, by desaturating the blues only by 50 percent, we could win about 50% of brightness/ luminance, when seen as percentages of achromatic luminance. Another way to describe this is to look at which luminance boost can still be done (typically in a second luminance processing block/phase) compared to the luminance we have currently. Suppose we start with maximum blue (B=0, R=G=0), which has a V=max(R,G,B)=1, and a Y=0.07. When half desaturating this color, we go to a B=0.536. Since in this blue hue quadrant blue will always be the largest color component, we can still boost brightness or luminance by boosting blue up to maximally B=1 (for that saturation, i.e. e.g. keeping R and G the same). In general we can boost by 1/max(R,G,B) desat, i.e. the maximum color component after desaturation. In this example that would yield 1/0.536=1.87, i.e. we can still boost with 85%. So if there are a significant amount of blue pixels in the window, it will suddenly look much brighter. And blue being a powerful color, the stained glass window will also still look colorful even with desaturated blues. So the grader can accomplish this by defining a smaller than 1 saturation gain g in the region of V-Y around e.g. 0.6. So we show a couple of examples of how saturation would behave. If for a half saturated bright yellow having V-Y value of 0.012 we specify a desaturation strategy 501 with say g=0.9, then a darker yellow on the same V-Y line will have the same strategy 502, i.e. be desaturated by the same amount. Yet another color can be (de)saturated by a different strategy 503, or different amount g2(Y-V). And for the blues we can define yet another saturation amount g3 (504). Our described saturation strategy is so interesting, in particular for dynamic range conversion, because, contrary to conventional strategies (applying a constant gain to the difference signals R-Y etc.) which would desaturate the brights like yellows too much, it can desaturate mostly the dark colors like blue, red and magenta, which give the most impact in the brightness-colorfulness optimization. Also, the method is easily reversible (if only we design the saturation function to not have too low differential gain), which makes the calculation of FC-1 from FC at the encoder (or even decoder) side simple and robust for those scenarios that would need this.

Figure 4A:
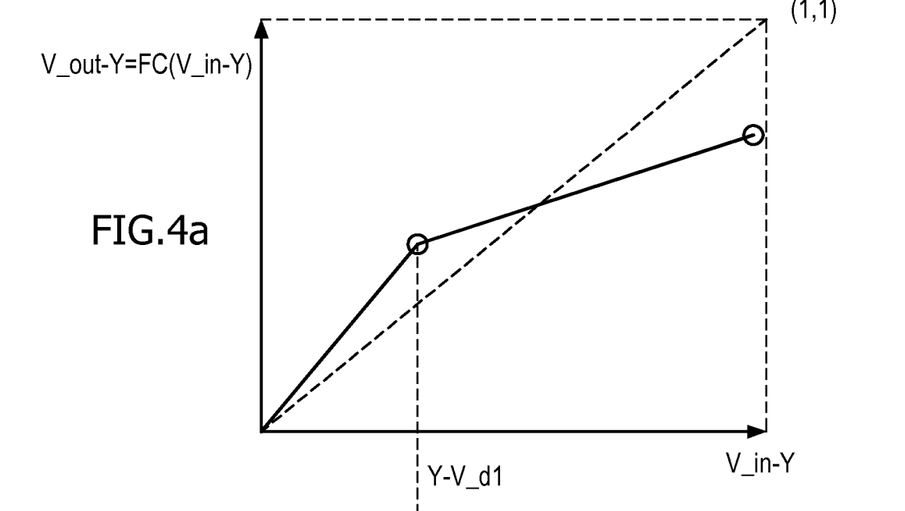
FIG. 4 schematically illustrates one possibility of a simple manner for a human grader to specify a g(V-Y) saturation specification.
Figure 4B:
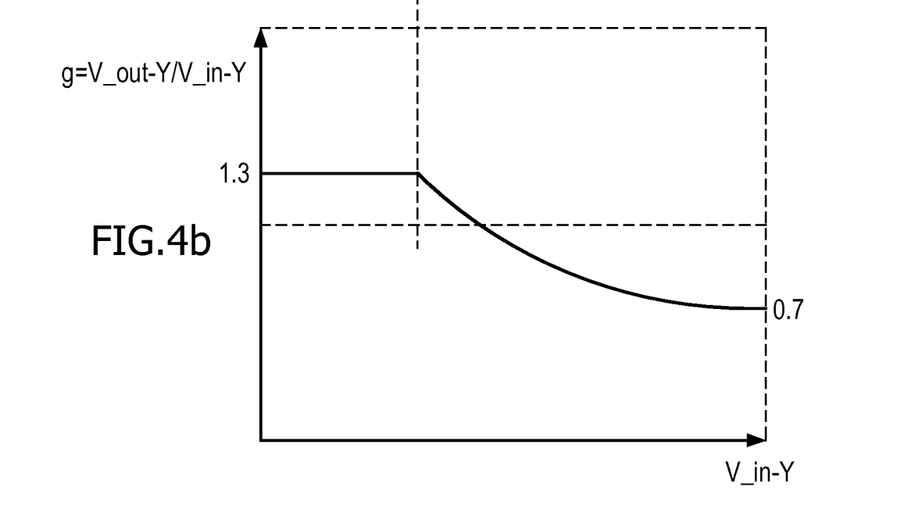
Figure 5:
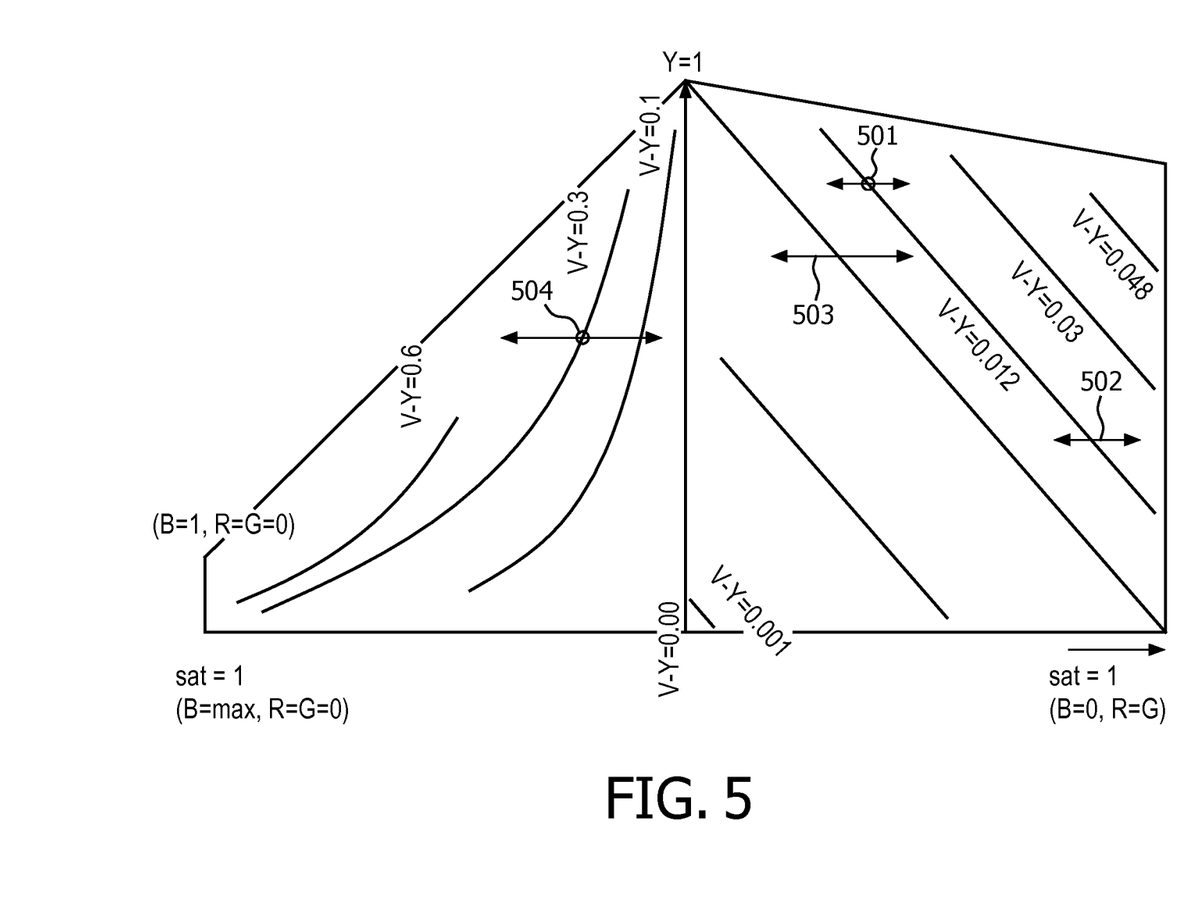
FIG. 5 schematically illustrates what the V-Y specification would look like in an RGB color gamut, with R a red, G a green, and B a blue additive display primary color.

Returning to FIG. 4, the grader can specify a saturation boost scenario in general (note that V-Y also decreases with luminance generally), and a desaturation for the colors that are naturally non-luminous like the blues, and need to be desaturated and boosted. He would specify the former to be e.g. 1.3 up to a chosen control point of Y-V_d1, and then use a linear slope which ends at a desaturation value of e.g. 0.7 for the bright blues (with the high Y-V values). For extreme HDR to LDR conversions we would get much lower end values, e.g. 0.1. Even such a quick specification will give him a good looking LDR image. The upper graph FIG. 4a shows the function V_out-Y vs. V_in-Y of the color transformation, and the lower graph FIG. 4b the corresponding gain. Although we elucidated the encoded image signal with a metadata specification of g(V-Y), of course the V_out specification of FIG. 5a may be used mutatis mutandis.

The algorithmic components disclosed in this text may (entirely or in part) be realized in practice as hardware (e.g. parts of an application specific IC) or as software running on a special digital signal processor, or a generic processor, etc. A memory product should be understood as any physical realization comprising a memory, in particular anything which can be purchased, and non-limitatively covers such embodiments as e.g. an optical disk or other detachable and carryable memory product, or a memory segment on a network-connected server from which the contents of a specific part of the memory can be downloaded, etc.

It should be understandable to the skilled person from our presentation which components may be optional improvements and can be realized in combination with other components, and how (optional) steps of methods correspond to respective means of apparatuses, and vice versa. The word "apparatus" in this application is used in its broadest sense, namely a group of means allowing the realization of a particular objective, and can hence e.g. be (a small circuit part of) an IC, or a dedicated appliance (such as an appliance with a display), or part of a networked system, etc. "Arrangement" is also intended to be used in the broadest sense, so it may comprise inter alia a single apparatus, a part of an apparatus, a collection of (parts of) cooperating apparatuses, etc.

The computer program product denotation should be understood to encompass any physical realization of a collection of commands enabling a generic or special purpose processor, after a series of loading steps (which may include intermediate conversion steps, such as translation to an intermediate language, and a final processor language) to enter the commands into the processor, and to execute any of the characteristic functions of an invention. In particular, the computer program product may be realized as data on a carrier such as e.g. a disk or tape, data present in a memory, data travelling via a network connection—wired or wireless—, or program code on paper. Apart from program code, characteristic data required for the program may also be embodied as a computer program product.

Some of the steps required for the operation of the method may be already present in the functionality of the processor instead of described in the computer program product, such as data input and output steps.

It should be noted that the above-mentioned embodiments illustrate rather than limit the invention. Where the skilled person can easily realize a mapping of the presented examples to other regions of the claims, we have for conciseness not mentioned all these options in-depth. Apart from combinations of elements of the invention as combined in the claims, other combinations of the elements are possible. Any combination of elements can be realized in a single dedicated element.

Any reference sign between parentheses in the claim is not intended for limiting the claim. The word "comprising" does not exclude the presence of elements or aspects not listed in a claim. The word "a" or "an" preceding an element does not exclude the presence of a plurality of such elements.

The invention claimed is:

1. A display apparatus comprising a display and an image encoder for encoding two images for a time instant, and for encoding a matrix of pixel colors for the two images, the two images including a first image having a first dynamic range and a second image having a second dynamic range, the first dynamic range image being larger by at least a factor two than the second dynamic range, and the second image having a peak brightness of 100 nit, the image encoder comprising:

a specification unit which comprises a color saturation modification apparatus configured to determine linear color differences defined as a linear additive primary color component of an input color minus a luminance of the input color, and to do a multiplication of the linear color differences by a gain, wherein the color saturation modification apparatus is configured to determine the gain from a saturation modification specification function depending on a difference value being defined as a value of a highest one of the linear color differences, and to add the luminance to a result of the multiplication of the linear color differences by the gain, yielding an output color;

a saturation specification unit configured to specify a desired saturation modification specification function F which encodes gains as a function of the difference value, wherein the desired saturation modification specification function is used by the color saturation modification apparatus to calculate a pixel gain for a highest linear color difference of a pixel being color processed, for effecting a saturation change by multiplying the linear color differences by the pixel gain; and a formatter configured to output in an image signal an encoding of an image comprising the matrix of pixel colors, and to output as data the desired saturation modification specification function for display of one of the first image and the second image on the display.

2. A display apparatus comprising a display and an image decoder for decoding two images of at least a factor two different luminance dynamic range for a time instant, a first image of the two images being a high dynamic range image having a dynamic range higher than a second image of the two images and the second image having a peak brightness of 100 nit, the decoder comprising:
- a color mapper configured to derive the first image by applying functions received via an image input to the second image, the functions including a luminance transformation function and a saturation modification specification function,
- wherein the color mapper comprises a color saturation modification apparatus configured to:
- determine linear color differences defined as a linear additive primary color component of an input color minus a luminance of the input color,
- do a multiplication of the linear color differences by a gain determined as the result of applying the saturation modification specification function on a difference value being defined as the value of a highest one of the linear color differences,
- add the luminance to the result of the multiplication of the linear color differences by the gain, yielding an output color, and
- obtain the first image of the two images by applying the functions to the second image for display of one of the first image and the second image on the display.

3. A method of image encoding comprising acts of:
receiving a first image of a first luminance dynamic range;
applying a color transformation to the first image to obtain a second image of a different second luminance dynamic range which is different from the first dynamic range by at least a factor two, and a peak brightness of the second image being 100 nit;
outputting an image signal comprising one of the first image and the second image of the second dynamic range, and metadata specifying functions used in the color transformation, wherein the color transformation comprises applying a method of color saturation including determining linear color differences defined as a linear additive primary color component of an input color minus a luminance of the input color, performing a multiplication of the linear color differences by a gain, wherein the gain is determined from a saturation modification specification function depending on a difference value being defined as a value of a highest one of the linear color differences, and adding the luminance to a result of the multiplication of the linear color differences by the gain, yielding an output color, and the metadata comprising a saturation modification specification function specifying a pixel gain for a highest linear color pixel of a pixel color; and
displaying one of the first image and the second image on a display.

4. A method of image decoding comprising acts of:
receiving a first image of a first luminance dynamic range;
receiving a saturation modification specification function including gain values defined as output of a function of a highest difference value being defined as a value of a highest one of linear color differences;
applying a color transformation to the first image, the color transformation comprising acts of:
- determining the linear color differences defined as a linear additive primary color component of an input color minus a luminance of the first color,
- determining a gain corresponding to the highest one of the linear color differences, and
- multiplying the linear color differences by the gain to obtain second image of a second luminance dynamic range which is at least a factor of two different, wherein the second has a peak brightness of 100 nit;
outputting an image including one of the first image and the second image; and
displaying one of the first image and the second image on a display.

* * * * *